US007763991B2

(12) United States Patent
Ogiwara et al.

(10) Patent No.: US 7,763,991 B2
(45) Date of Patent: Jul. 27, 2010

(54) VOLTAGE GENERATING CIRCUIT

(75) Inventors: Ryu Ogiwara, Kanagawa-ken (JP); Daisaburo Takashima, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 76 days.

(21) Appl. No.: 12/266,143

(22) Filed: Nov. 6, 2008

(65) Prior Publication Data

US 2009/0115387 A1 May 7, 2009

(30) Foreign Application Priority Data

Nov. 7, 2007 (JP) ............................ 2007-289940

(51) Int. Cl.
*H02J 1/10* (2006.01)

(52) U.S. Cl. ........................................................ 307/43

(58) Field of Classification Search .................. 307/43, 307/44, 75
See application file for complete search history.

(56) References Cited

U.S. PATENT DOCUMENTS

| | | | |
|---|---|---|---|
| 5,189,316 A | 2/1993 | Murakami et al. | |
| 6,118,188 A * | 9/2000 | Youssef | 307/43 |
| 6,392,472 B1 | 5/2002 | Kobayashi et al. | |
| 7,095,273 B2 | 8/2006 | Sato et al. | |

* cited by examiner

*Primary Examiner*—Shawn Riley
(74) *Attorney, Agent, or Firm*—Oblon, Spivak, McClelland, Maier & Neustadt, L.L.P.

(57) ABSTRACT

A voltage generating circuit comprising: a switching device which includes a first end connected to a high potential side power source, and which becomes conductive in a first mode and becomes non-conductive in a second mode; a first transistor including a first main electrode connected to a second end of the switching device, a second main electrode connected to an output terminal, and a gate connected to a gate potential supply node; a second transistor including a first main electrode connected to the high potential side power source, a second main electrode connected to the output terminal, and a gate connected to the gate potential supply node; and a gate voltage stabilizing circuit that suppresses a fluctuation in potential of the potential supply node, the fluctuation accompanying a change between the first and second modes.

14 Claims, 9 Drawing Sheets

| | PERIOD (A) (STB→Active) | PERIOD (B) (Active) | PERIOD (C) (Active→STB) |
|---|---|---|---|
| VPG | "H"→ "L" | "L" | "L→ "H" |
| SG1 | "L"→ "H"→ "L" | "L" | "L"→ "H"→ "L" |
| SG2 | "H"→ "L" → "H" | "H" | "H"→ "L" → "H" |
| PTT2 | "OFF" → "ON" | "ON" | "ON" → "OFF" |
| NTT1 | "OFF" → "ON" | "ON" | "ON" → "OFF" |
| NT31 | "OFF" → "ON" → "OFF" | "OFF" | "OFF" → "ON" → "OFF" |
| NT32 | "ON" → "OFF" → "ON" | "ON" | "ON" → "OFF" → "ON" |
| N12 | "H"→ "L" | "L" | "L→ "H" |

FIG. 4

| | PERIOD (A) (STB→Active) | PERIOD (B) (Active) | PERIOD (C) (Active→STB) |
|---|---|---|---|
| VPG | "H"→ "L" | "L" | "L→ "H" |
| SG3 | "L"→ "H"→ "L" | "L" | "L"→ "L" |
| SG4 | "H"→ "L" → "H" | "H" | "H"→ "H" |
| SG5 | "H"→ "H" | "H" | "H"→ "L" → "H" |
| SG6 | "L"→ "L" | "L" | "L"→ "H"→ "L" |
| PTT2 | "OFF" → "ON" | "ON" | "ON" → "OFF" |
| NTT1 | "OFF" → "ON" | "ON" | "ON" → "OFF" |
| NT41 | "OFF" → "ON" → "OFF" | "OFF" | "OFF" → "OFF" |
| NT42 | "ON" → "OFF" → "ON" | "ON" | "ON" → "ON" |
| PT41 | "OFF" → "OFF" | "OFF" | "OFF" → "ON" → "OFF" |
| PT42 | "ON" → "ON" | "ON" | "ON" → "OFF" → "ON" |
| N21 | $V_{SS}$→CHARGE C3→$V_{SS}$ | $V_{SS}$ | $V_{SS}$→$V_{DD}$ |
| N22 | $V_{DD}$→$V_{DD}$ | $V_{DD}$ | $V_{DD}$→CHARGE C4→$V_{DD}$ |

FIG. 8

| | PERIOD (A) (STB→Active) | PERIOD (B) (Active) | PERIOD (C) (Active→STB) |
|---|---|---|---|
| VPG | "H"→ "L" | "L" | "L→ "H" |
| SG7 | "L"→ "H"→ "L" | "L" | "L"→ "L" |
| SG8 | "H"→ "H" | "H" | "H"→ "L" → "H" |
| PTT2 | "OFF" → "ON" | "ON" | "ON" → "OFF" |
| NTT1 | "OFF" → "ON" | "ON" | "ON" → "OFF" |
| NT51 | "OFF" → "ON" → "OFF" | "OFF" | "OFF" → "OFF" |
| PT51 | "OFF" → "OFF" | "OFF" | "OFF" → "ON" → "OFF" |

FIG. 12

VOLTAGE GENERATING CIRCUIT

CROSS-REFERENCE TO RELATED APPLICATIONS

This application is based upon and claims the benefit of priority from the prior Japanese Patent Application No. 2007-289940, filed Nov. 7, 2007, the entire contents of which are incorporated herein by reference.

BACKGROUND OF THE INVENTION

1. Field of the Invention

The present invention relates to a voltage generating circuit used in a semiconductor storage, an SoC or the like.

2. Description of the Related Art

With advancement of miniaturization, low voltage operation, and high integration of semiconductor devices, semiconductor chips for a semiconductor storage, a system on a chip (SoC) and the like have become equipped with a built-in voltage generating circuit for generating a different voltage from an external supply voltage. There are two types of circuits as the voltage generating circuit, that is, a voltage step-down circuit that steps down an external supply voltage and a voltage step-up circuit that steps up an external supply voltage. Furthermore, two types of circuits are used as the voltage step-down circuit: one is a voltage generating circuit (such as a series regulator) that is used, for example, in a standby mode in which an electric current does not flow much; and the other is a voltage generating circuit that includes a source follower type of output transistor, and is used, for example, in an active mode in which a current flows. In general, in the voltage generating circuit of the source follower type, a mirror transistor is provided in a preceding stage of an output transistor. The mirror transistor is of the same type as the output transistor and is diode-connected (gate-drain connection) (Refer to Japanese Patent Application Publication No. 2003-178584, page 8, FIG. 10, (Patent Document 1), for example).

When a source follower type of voltage generating circuit described in Patent Document 1 and the like changes from the standby state to the active state, or from the active state to the standby state, a gate voltage of the source follower type of step-down transistor fluctuates, thereby causing a fluctuation of an internal supply voltage that has been stepped down and outputted. For this reason, a stabilizing capacitor having a large capacity is generally provided on the output side, as a normal measure against gate voltage fluctuations in the source follower type of step-down transistor. Mounting such a large-capacity stabilizing capacitor in a large-scale integrated circuit (IC or LSI) including a voltage generation circuit causes a problem of increase of the chip area.

SUMMARY OF THE INVENTION

According to an aspect of the present invention, there is provided a voltage generating circuit comprising: a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current; a second step-down transistor including a gate controlled by the first voltage and a drain connected to the first high potential side power source, and outputting the second high potential side supply voltage from a source of the second step-down transistor in the active state and in a standby state which allows a flow of a second consumption current whose amount is less than that of the first consumption current; and a gate voltage stabilizing circuit including a first transistor including a drain to which the first voltage is inputted and a gate to which a first control signal is inputted, a second transistor including a drain connected to a source of the first transistor, a source to which the first voltage is inputted, and a gate to which a second control signal is inputted, and a capacitor connected to the source of the first transistor and the drain of the second transistor, when the standby state changes to the active state, the first transistor changing from OFF to ON based on the first control signal, the second transistor changing from ON to OFF based on the second control signal, and therefore the capacitor drawing a charge on the gate side of the first step-down transistor to suppress a fluctuation in the first voltage to be applied to the gate side of the first step-down transistor, and when the active state changes to the standby state, the first transistor changing from OFF to ON based on the first control signal, the second transistor changing from ON to OFF based on the second control signal, and therefore the capacitor discharging an accumulated charge to the gate side of the first step-down transistor to suppress the fluctuation in the first voltage to be applied to the gate of the first step-down transistor.

According to another aspect of the present invention, there is provided a voltage generating circuit comprising: a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current; a second step-down transistor including a gate controlled by the first voltage and a drain connected to the first high potential side power source side, and outputting the second high potential side supply voltage from a source of the second step-down transistor in the active state and in a standby state which allows a flow of a second consumption current whose amount is less than that of the first consumption current; and a first gate voltage stabilizing circuit including: a first transistor including a drain to which the first voltage is inputted and a gate to which a first control signal is inputted, a second transistor including a drain connected to a source of the first transistor, a source connected to a low potential side power source, and a gate to which a second control signal is inputted, and a first capacitor including a first end connected to a source of the first transistor and to the drain of the second transistor, and a second end connected to the low potential side power source, when the standby state changes to the active state, the first transistor changing from OFF to ON based on the first control signal, the second transistor changing from ON to OFF based on the second control signal, and therefore the first capacitor drawing a charge of the first step-down transistor on the gate side to suppress a fluctuation in the first voltage to be applied to the gate of the first step-down transistor, and a second gate voltage stabilizing circuit including: a third transistor including a drain to which the first voltage is inputted and a gate to which a third control signal is inputted, a fourth transistor including a source connected to the first high potential side power source, a drain connected to a source of the third transistor, and a gate to which a fourth control signal is inputted, and a second capacitor including a first end connected to the source of the third transistor and to the drain of the fourth transistor, and a second end connected to the first high potential side power source, when the active state changes to the standby state, the third transistor being kept ON based on the third control signal, the fourth transistor being kept OFF based on the fourth control signal, and therefore the second capacitor discharging an accumulated charge to the gate side of the first step-down transistor to suppress the fluctuation in the first voltage to be applied to the gate of the first step-down transistor.

According to another aspect of the present invention, there is provided a voltage generating circuit comprising: a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current; a second step-down transistor including a gate controlled by the first voltage and a drain connected to the first high potential side power source, and outputting the second high potential side supply voltage from a source in the active state and in a standby state which allows a flow of a second consumption current whose amount is less than that of the first consumption current; and a first gate voltage stabilizing circuit including a first transistor including a drain to which the first voltage is inputted and a gate to which a first control signal is inputted, and a first resistance including first and second ends connected to a source of the first transistor and to a low potential side power source, respectively, when the standby state changes to the active state, the first transistor changing from OFF to ON based on the first control signal, and therefore the first gate voltage stabilizing circuit drawing a charge on the gate side of the first step-down transistor to the low potential side power source side through the first resistance to suppress a fluctuation in the first voltage to be applied to the gate of the first step-down transistor; and a second gate voltage stabilizing circuit including a second transistor including a drain to which the first voltage is inputted and a gate to which a second control signal is inputted, and a second resistance including first and second ends connected to a source of the second transistor and to the first high potential side power source, respectively, when the active state changes to the standby state, the second transistor turning ON based on the second control signal, and therefore the second gate voltage stabilizing circuit supplying a charge from the first high potential side power source side to the gate side of the first step-down transistor through the resistance R2 to suppress the fluctuation in the first voltage to be applied to the gate of the first step-down transistor.

According to another aspect of the present invention, there is provided a voltage generating circuit comprising: a switching device which includes a first end connected to a high potential side power source, and which becomes conductive in a first mode and becomes non-conductive in a second mode; a first transistor including a first main electrode connected to a second end of the switching device, a second main electrode connected to an output terminal, and a gate connected to a gate potential supply node; a second transistor including a first main electrode connected to the high potential side power source, a second main electrode connected to the output terminal, and a gate connected to the gate potential supply node; and a gate voltage stabilizing circuit that suppresses a fluctuation in potential of the potential supply node, the fluctuation accompanying a change between the first and second modes.

BRIEF DESCRIPTION OF THE DRAWINGS

FIG. 4 is a drawing showing operation of the voltage generating circuit to the embodiment 1 of the present invention.

FIG. 8 is a drawing showing operation of the voltage generating circuit to the embodiment 2 of the present invention.

FIG. 12 is a drawing showing operation of the voltage generating circuit to the embodiment 3 of the present invention.

DETAILED DESCRIPTION OF THE INVENTION

Embodiments of the present invention will be described hereinafter with reference to the accompanying drawings.

Embodiment 1

Figure 1:
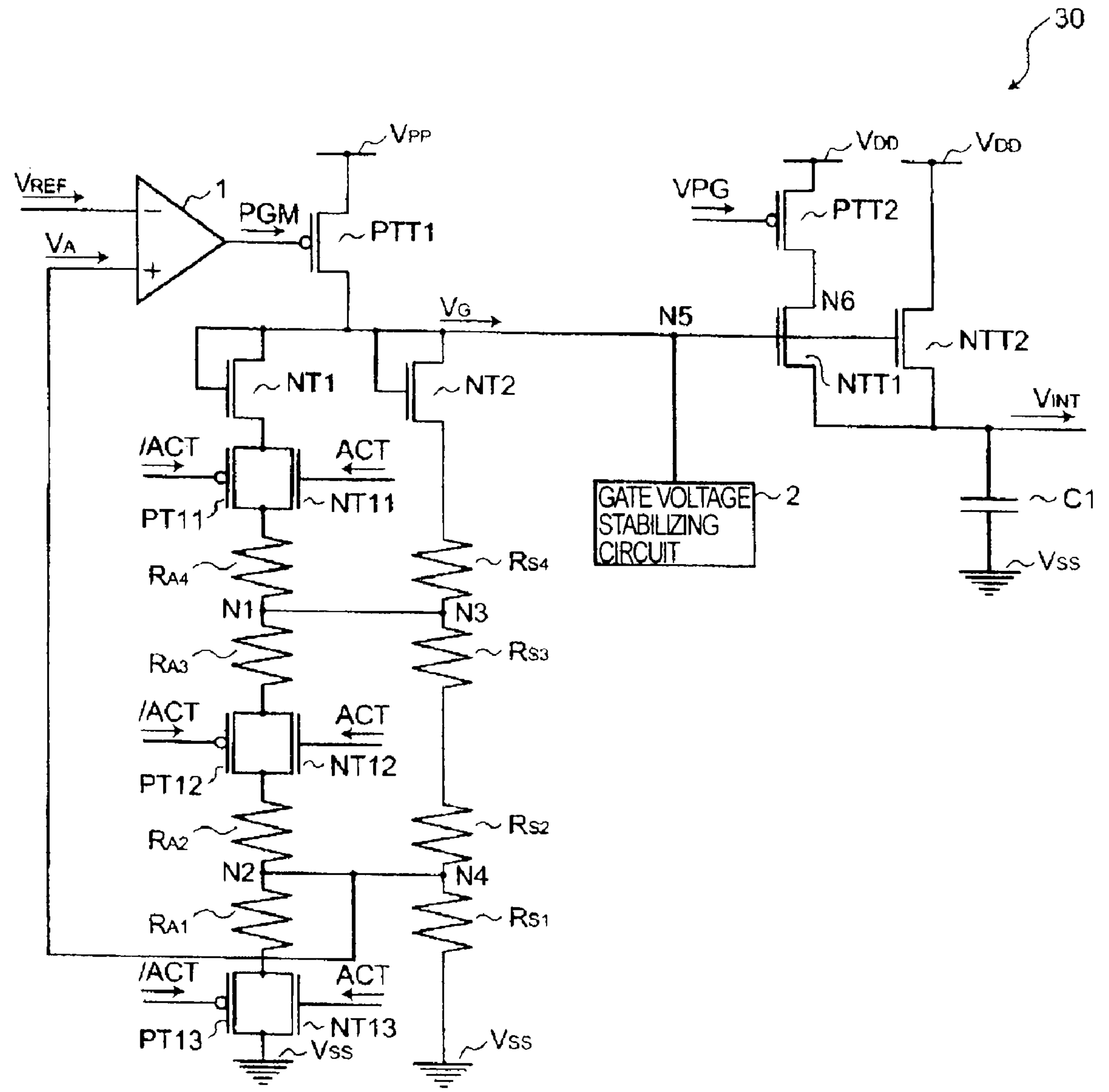
FIG. 1 is a circuit diagram showing a configuration of a voltage generating circuit according to an embodiment 1 of the present invention.
Figure 2:
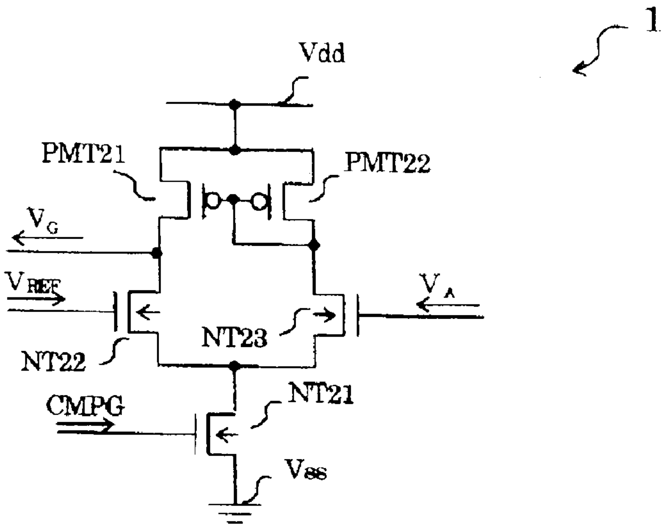
FIG. 2 is a circuit diagram showing a configuration of a differential amplifier circuit according to the embodiment 1 of the present invention.
Figure 3:
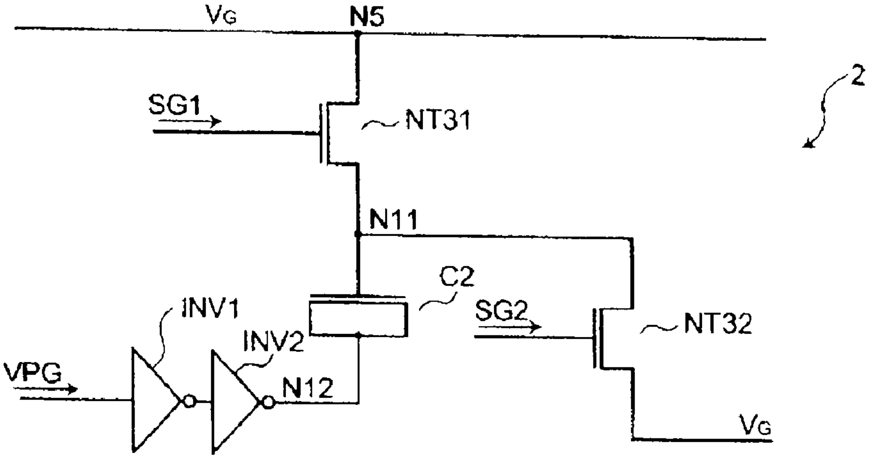
FIG. 3 is a circuit diagram showing a gate voltage stabilizing circuit according to the embodiment 1 of the present invention.

First, a voltage generating circuit according to Embodiment 1 of the present invention is described with reference to the drawings. FIG. 1 is a circuit diagram showing configuration of a voltage generating circuit. FIG. 2 is a circuit diagram showing a differential amplifier circuit. FIG. 3 is a circuit diagram showing a gate voltage stabilizing circuit. In the present embodiment, there is provided a gate voltage stabilizing circuit that suppresses a change of a gate voltage of a step-down transistor, when a standby state changes to an active state or when an active state changes to a standby state.

As shown in FIG. 1, a voltage generating circuit 30 is provided with a differential amplifier circuit 1, a gate voltage stabilizing circuit 2, an N channel MIS transistor NT1, an N channel MIS transistor NT2, an N channel MIS transistors NT11 to NT13, an N channel MIS transistor NTT1, an N channel MIS transistor NTT2, a P channel MIS transistors PT11 to PT13, a P channel MIS transistor PTT1, a P channel MIS transistor PTT2, resistances $R_{A1}$ to $R_{A4}$, resistances $R_{S1}$ to $R_{S4}$, and a capacitor C1. Note that a MIS transistor is also referred to as a metal insulator semiconductor field effect transistor (MISFET).

The voltage generating circuit 30 is provided inside a semiconductor chip as a semiconductor storage, for example. The voltage generating circuit 30 receives input of a high potential side power source $V_{DD}$ voltage as an external supply voltage and a high potential side power source $V_{PP}$ voltage as a supply voltage for stepping up a word line voltage, and outputs an output voltage $V_{INT}$ as a stepped-down internal supply voltage to unillustrated various circuits provided in the semiconductor chip.

In the P channel MIS transistor PTT1, the high potential side power source $V_{PP}$ voltage is inputted into a source thereof, and a control signal PGM to be outputted from the differential amplifier circuit 1 is inputted into a gate. The P channel MIS transistor PTT1 turns "ON" when the control signal PGM is at "Low" level to output an output voltage (gate voltage) $V_G$ from the drain side.

In the N channel MIS transistor NT1, the output voltage (gate voltage) $V_G$ is inputted into a drain thereof to connect a gate thereto. The N channel MIS transistor NT1 acts as a diode-connected mirror transistor.

In the N channel MIS transistor NT2, the output voltage (gate voltage) $V_G$ is inputted into a drain to connect a gate thereto. The N channel MIS transistor NT2 acts as a diode-connected mirror transistor.

In the P channel MIS transistor PTT2, the high potential side power source $V_{DD}$ voltage is inputted into a source, and a control signal VPG is inputted into a gate. The P channel MIS transistor PTT2 turns "ON" when the control signal VPG is at "Low" level.

The N channel MIS transistor NTT1 is an output transistor of a source follower type. A drain thereof is connected to a drain of the P channel MIS transistor PTT2, the output voltage (gate voltage) $V_G$ is inputted into a gate, and an output voltage $V_{INT}$ is outputted as an internal supply voltage that has been stepped down when the control signal VPG is active.

The N channel MIS transistor NTT2 is an output transistor of a source follower type. The high potential side power source $V_{DD}$ voltage is inputted into a drain thereof, the output voltage (gate voltage) $V_G$ is inputted to a gate, and the output voltage $V_{INT}$ is outputted as the internal supply voltage that has been stepped down in the standby state and the active state.

The N channel MIS transistor NTT1 that is a step-down transistor supplies an output voltage $V_{INT}$ potential when the control signal VPG turns "ON" the P channel MIS transistor PTT2 (in the active state). The N channel MIS transistor NTT2 that is a step-down transistor supplies the output voltage $V_{INT}$ potential in the standby state and in the active state, not by using the control signal VPG. Here, assume that the amount of current in the active state is Iact, the amount of current in the standby state is Istb, a gate width of the N channel MIS transistor NTT1 is W1, and a gate width of the N channel MIS transistor NTT1 is W2. Where the gate lengths of the N channel MIS transistors NTT1 and NTT2 are same, designing is performed so as to satisfy the following:

$$Iact/Istb = W1/W2 \qquad \text{Expression (1)}$$

In other words, designing is performed so that an amount of load current per unit gate width in the standby state can match that in the active state.

One end of the capacitor C1 is connected to sources of the N channel MIS transistors NTT1 and NTT2, and the other end thereof is connected to the low potential side power source $V_{SS}$. The capacitor C1 is mounted (on-chip) on a semiconductor integrated circuit to be provided in the voltage generating circuit 30.

In the N channel MIS transistor NTT11, a drain is connected to the source of the N channel MIS transistor NT1, a source is connected to one end of a resistance $R_{A4}$, and a control signal ACT is inputted into a gate. In the P channel MIS transistor PT11, a source is connected to the source of the N channel MIS transistor NT1, a drain is connected to one end of the resistance $R_{A4}$, and a control signal /ACT is inputted to a gate. The control signal /ACT is a signal having an opposite phase to the control signal ACT.

The N channel MIS transistor NT11 and the P channel MIS transistor PT11 function as transfer gates and turn "ON" when the control signal ACT is at "High" level (the control signal /ACT is at "Low" level). The other end of the resistance $R_{A4}$ is connected to a node N1. One end of a resistance $R_{A3}$ is connected to a node N1.

In the N channel MIS transistor NT12, a drain is connected to the other end of the resistance $R_{A3}$, a source is connected to one end of the resistance $R_{A2}$, and the control signal ACT is inputted into a gate. In the P channel MIS transistor PT12, a source is connected to other end of the resistance $R_{A3}$, a drain is connected to one end of the resistance $R_{A2}$, and the control signal /ACT is inputted into a gate.

The N channel MIS transistor NT12 and the P channel MIS transistor PT 12 function as transfer gates and turn "ON" when the control signal ACT is at "High" level (the control signal /ACT is at "Low" level). The other end of the resistance $R_{A2}$ is connected to a node N2. One end of a resistance $R_{A1}$ is connected to the node N2.

In the N channel MIS transistor NT13, a drain is connected to the other end of the resistance $R_{A1}$, a source is connected to the low potential side power source $V_{SS}$ that is a ground voltage, and the control signal ACT is inputted into a gate. In the P channel MIS transistor PT13, a source is connected to the other end of the resistance $R_{A1}$, a drain is connected to the low potential side power source $V_{SS}$, and the control signal /ACT is inputted into a gate.

The N channel MIS transistor NT13 and the P channel MIS transistor PT13 function as transfer gates and turn "ON" when the control signal ACT is at "High" level (the control signal /ACT is at "Low" level).

On end of the resistance $R_{S4}$ is connected to the source of the N channel MIS transistor NT2, and the other end thereof is connected to the node N1 and a node N3. One end of a resistance $R_{S3}$ is connected to the node N3 and the other end thereof is connected to one end of a resistance $R_{S2}$. The other end of the resistance $R_{S2}$ is connected to the node N2 and a node N4. One end of a resistance $R_{S1}$ is connected to the Node N4 and the other end thereof is connected to the low potential side power source $V_{SS}$.

Here, on the N channel MIS transistor NT2 side (the N channel MIS transistor NT2, the resistances $R_{S1}$ to $R_{S4}$), current always flows to the low potential side power source $V_{SS}$ side, while on the N channel MIS transistor NT1 side (the N channel MIS transistor NT1, the resistances $R_{A1}$ to $R_{A4}$, the N channel MIS transistors NT11 to NT13, and the P channel MIS transistors PT11 to PT13), current flows to the low potential side power source $V_{SS}$ side in the active state (when the control signal ACT is at "High" level (the control signal /ACT is at "Low" level)). A feedback voltage $V_A$ that is a voltage resistive-divided from the nodes N2 and N4 is inputted to a (+) port on the input side of the differential amplifier circuit 1.

As shown in FIG. 2, the differential amplifier circuit 1 is provided with N channel MIS transistors NT21 to NT 23, a P channel MIS transistor PT21, and a P channel MIS transistor PT22.

In the differential amplifier circuit 1, a reference voltage $V_{REF}$ is inputted to a (−) port on the input side, the feedback voltage $V_A$ is inputted to the (+) port on the input side, and a differential amplified signal is outputted as the output voltage (gate voltage) $V_G$.

The reference voltage $V_{REF}$ used herein is a highly-precise voltage that has very low dependence on temperature and the high potential side power source $V_{DD}$ voltage. For example, such highly-precise voltage is outputted from a band gap reference (BGR) circuit.

In the P channel MIS transistor PT21, a source is connected to the high potential side power source $V_{DD}$. In the P channel MIS transistor PT 22, a source is connected to the high potential side power source $V_{DD}$, a gate is connected to a drain of the PT22 and a gate of the P channel MIS transistor PT21. The P channel MIS transistor PT21 and the P channel MIS transistor PT22 constitutes a current mirror circuit.

In the N channel MIS transistor NT21, a drain is connected to a drain of the P channel MIS transistor PT21 and the reference voltage $V_{REF}$ is inputted into a gate of the N channel MIS transistor NT21. In the N channel MIS transistor NT23, a drain is connected to the drain of the P channel MIS transistor PT22 and the feedback reference $V_A$ is inputted to a gate of the N channel MIS transistor NT23. The N channel MIS transistor NT22 and the N channel MIS transistor NT23 form a differential pair. The output voltage (gate voltage) $V_G$ is outputted from between the drain of the P channel MIS transistor PT21 and the drain of the N channel MIS transistor NT22.

In the N channel MIS transistor NT21, a drain is connected to sources of the N channel MIS transistors NT 22 and NT23, a source is connected to the low potential side power source $V_{SS}$, and a control signal CMPG is inputted into a gate. The N channel MIS transistor NT21 functions as a constant current source.

As shown in FIG. 3, the gate voltage stabilizing circuit 2 is provided with a capacitor C2, an inverter INV1, an inverter INV2, an N channel MIS transistor NT31, and an N channel MIS transistor NT32. One end of the capacitor C2 is a gate of one of the N channel MIS transistors, and the other end thereof is the commonly connected source and drain of the N channel MIS transistors. The gate voltage stabilizing circuit 2 has a function to suppress a change in the gate voltage of the step-down transistor when the standby state changes to the active state or when the active state changes to standby state.

In the N channel MIS transistor NT 31, a drain is connected to a node N5 (output voltage (gate voltage) $V_G$), a source is connected to a node N11, and a control signal SG1 is inputted into a gate. In the N channel MIS transistor NT32, a drain is connected to the node N11, the output voltage (gate voltage) $V_G$ is inputted into a source, and a control signal SG2 is inputted into a gate.

One end of the capacitor C2 is connected to the node N11, and the other end thereof is connected to a node N12. The inverter INV1 inputs the control signal VPG and inverses the signal. The inverter INV2 inputs a signal to be outputted from the inverter INV1, and outputs a signal to the node N12, the signal having been inverted from the signal outputted from the inverter INV1.

Next, operation of a voltage generating circuit will be described with reference to FIG. 4. FIG. 4 is a chart showing operation of the voltage generating circuit. Here, the operation of the voltage generating circuit is divided into the following 3 periods and described: (A) a period of a standby state (including time to change to an active state), (B) a period of the active state, and (C) a period after the active state changes to the standby state.

As shown in FIG. 4, in the voltage generating circuit 30, first, the control signal VPG is at "High" level, and therefore the P channel MIS transistor PTT2 turns "OFF," in the standby state (period (A)). Accordingly, the N channel MIS transistor NTT1 does not supply output voltage VINT potential, while the N channel MIS transistor NTT2 supplies the output voltage $V_{INT}$ potential. In the gate voltage stabilizing circuit 2, the N channel MIS transistor NT31 turns "OFF" when a control signal SG1 is at "Low" level, the N channel MIS transistor NT32 turns "ON" when a control signal SG2 is at "High" level, and the node 12 is at "High" level when the control signal VPG is at "High" level. Accordingly, no charge is accumulated in the capacitor C2.

Then, immediately after the standby state changes to the active state (period (A)), the control signal VPG changes from "High" level to "Low" level and the P channel MIS transistor PTT2 turns "ON". Thus, the N channel MIS transistor NTT1 supplies the output voltage $V_{INT}$ potential. Meanwhile, the N channel MIS transistor NTT 2 still supplies the output voltage $V_{INT}$ potential irrespective of whether it is in the standby state or in the active state. At this time, a voltage on the drain side (the node N6) of the N channel MIS transistor NTT1 increases, and therefore the gate voltage $V_G$ is likely to rise due to coupling capacitance between the drain and gate of the N channel MIS transistor NTT1.

In the gate voltage stabilizing circuit 2, however, the control signal SG1 changes from "Low" level to "High" level to cause the N channel MIS transistor NT 31 to turn "ON," the control signal SG2 changes from "High" level to "Low" level to cause the N channel MIS transistor NT 32 to turn "OFF," and the control signal VPG changes from "High" level to "Low" level to cause the node N12 to change to "Low" level. Accordingly, charges flow from the node N5 (output voltage (gate voltage) $V_G$) into the capacitor C2 and are accumulated therein. Thus, the gate voltage stabilizing circuit 2 functions so as to lower the gate voltage $V_G$ applied to the N channel MIS transistor NTT1 and to control increase of the output voltage (gate voltage) $V_G$.

Here, in the conventional configuration without the stabilizing circuit according to the present invention shown in FIG. 3, assume that a coupling capacitance between the drain and the gate of the N channel MIS transistor NTT1 is Cgd, a gate capacitance of the N channel MIS transistor NTT1 is Cg, a voltage fluctuation between the standby state and the active state of the drain voltage of the N channel MIS transistor NTT1 is ΔVd, and a fluctuation in the output $V_{INT}$ of the voltage generating circuit 30 and in the gate voltage of the N channel MIS transistor NTT1 are $\Delta V_G$. The following expressions are obtained.

$$\Delta V_G=\Delta Vd\times(Cgd/Cg) \quad \text{Expression (2)}$$

$$\Delta Vd=V_{DD}-V_{INT} \quad \text{Expression (3)}$$

As the gate capacitance Cg becomes larger, $\Delta V_G$ becomes smaller, and thus the fluctuation in $V_{INT}$ also becomes smaller, which however leads to the problem that the chip area expands.

Thus, by providing the gate voltage stabilizing circuit 2 as shown in FIG. 3 of this embodiment, an attempt is made to absorb an increased potential of the gate voltage $V_G$ through coupling, when the standby state transits to the active state. As it is believed that the charge generated in the Node 5 due to coupling is $\Delta V_G\times Cg$, the charge generated in the node N5 can be absorbed if the capacitance of the capacitor C2 is determined so as to satisfy the following expression, $$\Delta V_G\times Cg=C_2\times V_{PG} \quad \text{Expression (4)}$$

where the capacitance of the capacitor C2 in FIG. 3 is $C_3$ and the voltage of the control signal VPG is $V_{PG}$. A case of stepping down the gate voltage $V_G$ to be applied to the gate of the N channel MIS transistor NTT1 will be described later.

Next, when the standby state changes to the active state and after a predetermined period of time elapses (period (B)), the control signal VPG is at "Low" level and accordingly the P channel MIS transistor PTT2 has turned "ON". Therefore, the condition is maintained in which the N channel MIS transistor NTT1 supplies the output voltage $V_{INT}$ potential and the N channel MIS transistor NTT2 supplies the output voltage $V_{INT}$ potential.

In the gate voltage stabilizing circuit 2, since the control signal SG1 changes from "High" level to "Low" level to turn the N channel MIS transistor NT31 "OFF," the control signal SG2 changes from "Low" level to "High" level to turn the N channel MIS transistor NT32 "ON," and the node N12 becomes "Low" level with the control signal VPG at "Low" level, charges are accumulated in the capacitor C2.

Then, immediately after the active state changes to the standby state (period (C)), the control signal changes from "Low" level to "High" level and the P channel MIS transistor PTT 2 turns "OFF". The state is thus maintained in which the N channel MIS transistor NTT1 no longer supplies the output voltage $V_{INT}$ potential, while the N channel MIS transistor NTT2 continues to supply the output voltage $V_{INT}$ potential. At this time, the voltage on the drain (node N6) side of the N channel MIS transistor NTT1 is stepped down, and therefore the output voltage (gate voltage) $V_G$ is likely to lower due to the coupling capacitance of the N channel MIS transistor NTT1.

In the gate voltage stabilizing circuit 2, however, since the control signal SG1 changes from "Low" level to "High" level to turn the N channel MIS transistor NT31 "ON," the control signal SG2 changes from "High" level to "Low" level to turn N channel MIS transistor NT32 "OFF," the control signal VPG changes from "Low" level to "High" level to change the node N12 to "High" level, the charges accumulated in the capacitor C2 are discharged to the node N5 (output voltage (gate voltage) $V_G$). Thus, the gate voltage stabilizing circuit 2 functions to step up the gate voltage $V_G$ to be applied to the gate of the N channel MIS transistor NTT1, and thereby suppress a drop of the output voltage (gate voltage) $V_G$.

Next, after the active state changed to the standby state and the predetermined period elapsed (period (C)), which are not shown, the gate voltage stabilizing circuit 2 is set to the same as the standby state in the period (A).

As described above, the voltage generating circuit in this embodiment is provided with the differential amplifier circuit 1, the gate voltage stabilizing circuit 2, the N channel MIS transistor NT1, the N channel MIS transistor NT2, the N channel MIS transistors NT11 to NT13, the N channel MIS transistor NTT1, the N channel MIS transistor NTT2, the P channel MIS transistors PTT11 to PTT13, the P channel MIS transistor PTT1, the P channel MIS transistor PTT2, the resistances $R_{A1}$ to $R_{A4}$, the resistances $R_{S1}$ to $R_{S4}$, and the capacitor C1. The gate voltage stabilizing circuit 2 is provided with the capacitor C2, the inverter INV1, the inverter INV2, the N channel MIS transistor NT31, and the N channel MIS transistor NT32. When the standby state changes to the active state, or when the active state changes to the standby state, the gate voltage stabilizing circuit 2 suppresses a change in the gate voltage of the N channel MIS transistor NTT1 that is a step-down transistor.

Thus, while an increase is suppressed in the capacitance of the capacitor C1 mounted (on-chip) in a semiconductor integrated circuit where the voltage generating circuit 30 is provided, a fluctuation can be suppressed in the output voltage (gate voltage) $V_G$ to be generated when the standby state changes to the active state or when the active state changes to the standby state. Thereby, the output voltage $V_{INT}$ can be outputted as an internal supply voltage that has been stably stepped down.

Although this embodiment uses a MIS transistor for the transistor constituting the voltage generating circuit 30, a metal oxide semiconductor (MOS) transistor (also referred to as MOSFET) may be used as well.

Embodiment 2

Figure 5:
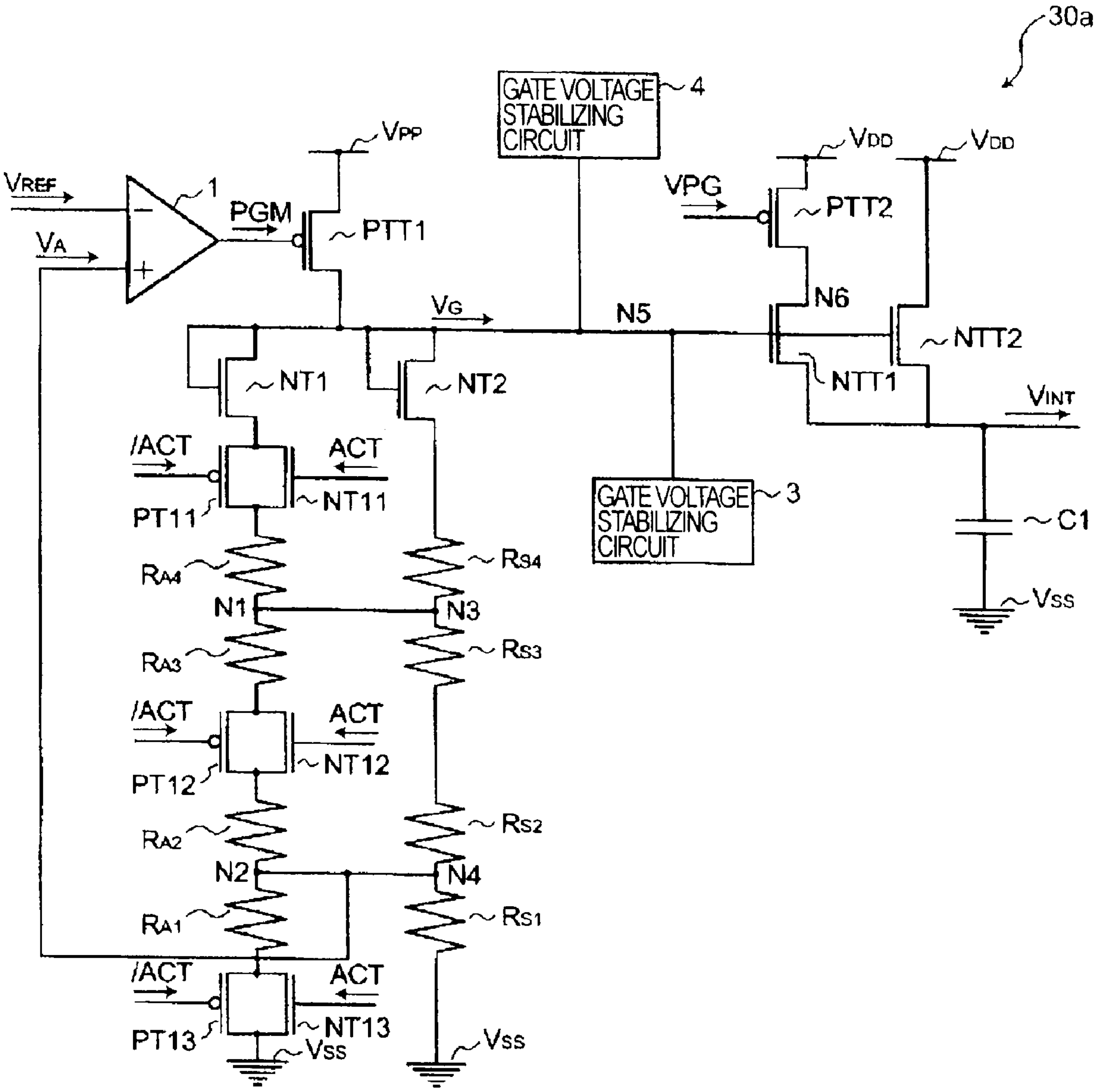
FIG. 5 is a circuit diagram showing a configuration of a voltage generating circuit according to an embodiment 2 of the present invention.
Figure 6:
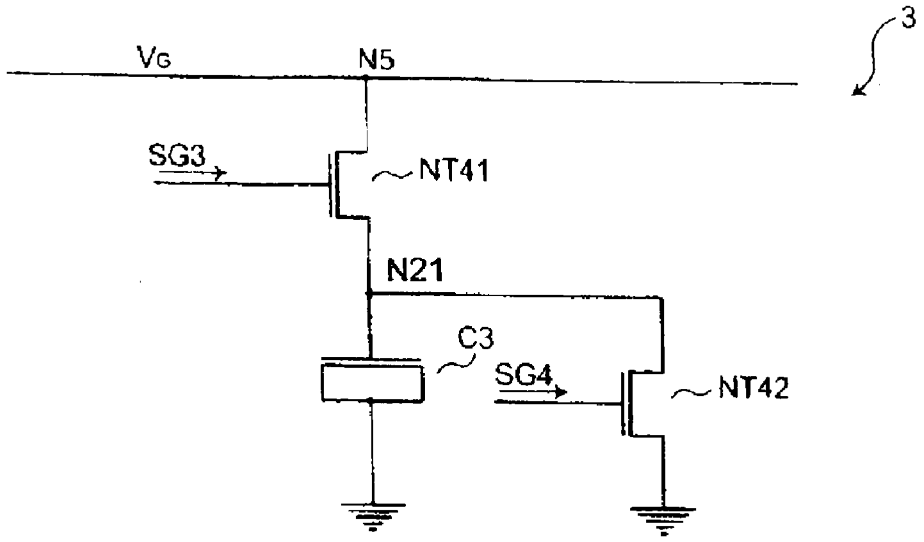
FIG. 6 is a circuit diagram showing a gate voltage stabilizing circuit on the low potential side power source side according to the embodiment 2 of the present invention.
Figure 7:
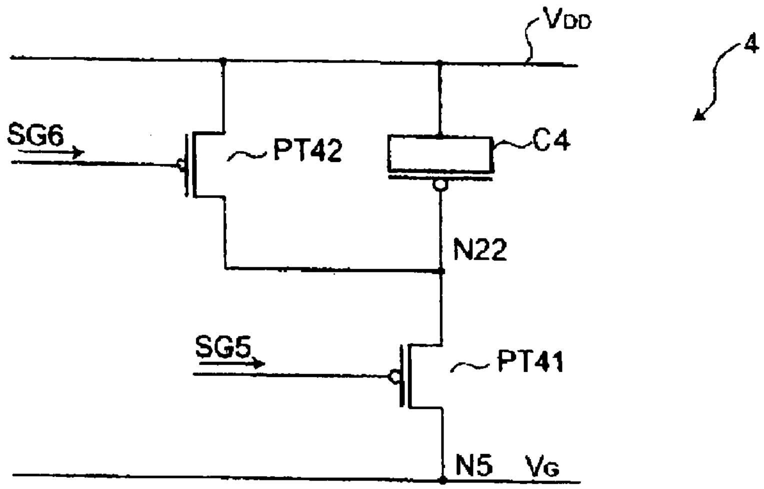
FIG. 7 is a circuit diagram showing a gate voltage stabilizing circuit on the high potential side power source side according to the embodiment 2 of the present invention.

A voltage generating circuit according to a second embodiment of the present invention will be described hereinafter with reference to the accompanying drawings. FIG. 5 is a circuit diagram showing a configuration of the voltage generating circuit. FIG. 6 is a circuit diagram showing a gate voltage stabilizing circuit on a low potential side power source side. FIG. 7 is a circuit diagram showing a gate voltage stabilizing circuit on a high potential side power source side. In this embodiment, there are provided a gate voltage stabilizing circuit that suppresses any change in the gate voltage of a step-down transistor when a standby state changes to an active state, and a gate voltage stabilizing circuit that suppresses any change in the gate voltage of the step-down transistor when the active state changes the standby state.

Hereinbelow, same symbols are assigned to components identical to those in the embodiment 1, a description of which is omitted, and only different parts will be described.

As shown in FIG. 5, a voltage generating circuit 30*a* is provided with the differential amplifier circuit 1, a gate voltage stabilizing circuit 3, a gate voltage stabilizing circuit 4, the N channel MIS transistor NT1, the N channel MIS transistor NT2, the N channel MIS transistors NT11 to NT13, the N channel MIS transistor NTT1, the N channel MIS transistor NTT2, the P channel MIS transistors PT11 to PT13, the P channel MIS transistor PTT1, the P channel MIS transistor PTT2, the resistances $R_{A1}$ to $R_{A4}$, the resistances $R_{S1}$ to $R_{S4}$, and the capacitor C1.

The voltage generating circuit 30*a* is provided inside a semiconductor chip as a semiconductor storage, for example. The voltage generating circuit 30*a* receives input of a high potential side power source $V_{DD}$ voltage as an external supply voltage and a high potential side power source $V_{PP}$ voltage as a supply voltage for stepping up a word line voltage, and outputs an output voltage $V_{INT}$ as a stepped-down internal supply voltage to unillustrated various circuits provided in the semiconductor chip.

As shown in FIG. 6, the gate voltage stabilizing circuit 3 is provided with a capacitor C3, an N channel MIS transistor NT41, and an N channel MIS transistor NT42. One end of the capacitor C3 is a gate of one of the N channel MIS transistors, and the other end thereof is the commonly connected source and drain of the N channel MIS transistors. The gate voltage stabilizing circuit 3 has a function to suppress a fluctuation in a gate voltage of the step-down transistor when the standby state changes to the active state.

In the N channel MIS transistor NT41, a drain is connected to the node N5 (output voltage (gate voltage) $V_G$), a source is connected to the node N21, and a control signal is inputted into a gate. In the N channel MIS transistor NT42, a drain is connected to the node N21, a source is connected to a low potential side power source $V_{SS}$, and a control signal SG4 is inputted into a gate.

One end of a capacitor C3 is connected to the node N21 and the other end is connected to the low potential side power source $V_{SS}$.

As shown in FIG. 7, the gate voltage stabilizing circuit 4 is provided with a capacitor C4, a P channel MIS transistor PT41, and a P channel MIS transistor PT42. One end of the capacitor C4 is a gate of one of the P channel MIS transistors, and the other end thereof is the commonly connected source and drain of the P channel MIS transistors. The gate voltage stabilizing circuit 4 has a function to suppress a change in a gate voltage of the step-down transistor when the active state changes to the standby state.

In the P channel MIS transistor PT42, a source is connected to a high potential side power source $V_{DD}$, a drain is connected to a node N22, and a control signal SG6 is inputted into a gate. In the P channel MIS transistor PT41, a source is connected to the node N22, a drain is connected to the node N5, and a control signal SG5 is inputted into a gate.

One end of a capacitor C4 is connected to the node N22 and the other end is connected to the high potential side power source $V_{DD}$.

Next, the operation of the voltage generating circuit will be described hereinafter with reference to FIG. 8. FIG. 8 is a drawing showing operation of the voltage generating circuit. Here, the operation of the voltage generating circuit is divided into the following 3 periods and described: (A) a period of a standby state (including time to change to an active state), (B) a period of the active state, and (C) a period after the active state changes to the standby state.

As shown in FIG. 8, in the voltage generating circuit 30*a*, first, in the standby state (period (A)), the control signal VPG is at "High" level, the P channel MIS transistor PTT 2 accordingly turns "OFF," and the N channel MIS transistor NTT1 does not supply the output voltage $V_{INT}$ potential, while the N channel MIS transistor NTT2 supplies the output voltage $V_{INT}$ potential. In the gate voltage stabilizing circuit 3, since the N channel MIS transistor NT41 has turned "OFF" with the control signal SG3 at "Low" level, and the N channel MIS transistor NT42 has turned "ON" with the control signal SG4 at "High" level, a voltage of 0 (zero) is applied to both electrodes of the capacitor C3. In the gate voltage stabilizing circuit 4, since the P channel MIS transistor PT 41 has turned "OFF" with the control signal SG5 at "High" level and the P channel MIS transistor PT42 has turned "ON" with the control signal SG6 at "Low" level, a high potential side power source $V_{DD}$ is applied to both electrodes of the capacitor C4.

Next, immediately after the standby state changes to the active state (period (A)), since the control signal VPG changes from "High" level to "Low" level and the P channel MIS transistor PTT2 accordingly turns "ON," the condition is maintained in which the N channel MIS transistor NTT1 supplies the output voltage $V_{INT}$ potential and the N channel MIS transistor NTT2 supplies the output voltage $V_{INT}$ potential. At this time, the voltage on the drain (node N6) side of the N channel MIS transistor NTT1 rises, and therefore the output voltage (gate voltage) $V_G$ is likely to rise due to the coupling capacitance of the N channel MIS transistor NTT1.

However, in the gate voltage stabilizing circuit 3, the control signal SG3 changes from "Low" level to "High" level to turn the N channel MIS transistor NT41 "ON," and the control signal SG4 changes from "High" level to "Low" level to turn the N channel MIS transistor NT42 "OFF". Accordingly, charges flow from the node N5 (output voltage (gate voltage) $V_G$) to the capacitor C3 via the N channel MIS transistor NT41 and are accumulated. For this reason, the gate voltage stabilizing circuit 3 functions to lower the gate voltage $V_G$ to be applied to the gate of the N channel MIS transistor NTT1 and to suppress a rise of the output voltage (gate voltage) $V_G$. In addition, the gate voltage stabilizing circuit 4 is in the same condition as in the standby state.

Next, when the standby state changes to the active state and after a predetermined period elapses (period (A)), the control signal is "Low" to turn the P channel MIS transistor PTT2 "ON," and therefore both the N channel MIS transistor NTT1 and the N channel MIS transistor NTT2 supply the output voltage $V_{INT}$ potential.

In the gate voltage stabilizing circuit 3, since the control signal SG3 changes from "High" level to "Low" level to turn the N channel MIS transistor NT41 "OFF," and the control signal SG4 changes from "Low" level to "High" level to turn the N channel MIS transistor NT 41 "ON," the charges accumulated in the capacitor C3 are discharged to the low potential side power source $V_{SS}$. In the gate voltage stabilizing circuit 4, since the control signal SG5 keeps "High" level to cause the P channel MIS transistor PT41 to be "OFF," the control signal SG6 keeps "Low" level to cause the P channel MIS transistor PT 42 to continue to be "ON," the condition continues in which there is no potential difference between both ends of the capacitor C4.

Then, immediately after the active state changes to the standby state (period (C)), since the control signal VPG changes from "Low" level to "High" level to turn the P channel MIS transistor PTT2 "OFF," the N channel MIS transistor NTT1 no longer supplies the output voltage $V_{INT}$ potential.

Meanwhile, the N channel MIS transistor NTT2 supplies the output voltage $V_{INT}$ potential. At this time, the voltage on the drain (the node N6) side of the N channel MIS transistor NTT1 lowers, and the output voltage (gate voltage) $V_G$ is likely to lower due to the coupling capacitance of the N channel MIS transistor NTT1.

In the gate voltage stabilizing circuit 4, however, since the control signal SG5 changes from "High" level to "Low" level to switch the P channel MIS transistor PT41 from "OFF" to "ON," and the control signal SG6 changes from "Low" level to "High" level to switch the P channel MIS transistor PT42 from "ON" to "OFF," charges accumulated in the capacitor C4 are discharged to the node N5 (output voltage (gate voltage) $V_G$). For this reason, the gate voltage stabilizing circuit 4 functions to increase the gate voltage $V_G$ to be applied to the gate of the N channel MIS transistor NTT1, and to suppress a drop of the output voltage (gate voltage) $V_G$. In addition, the gate voltage stabilizing circuit 3 maintains the previous condition.

Next, when the active state changes to the standby state, and after a predetermined period elapses (period (C)), which are not illustrated, the gate voltage stabilizing circuit 4 is set to the same condition as in the standby state of the period (A).

Thus, while an increase is suppressed in the capacitance of the capacitor C1 mounted (on-chip) in a semiconductor integrated circuit where the voltage generating circuit 30*a* is provided, a fluctuation can be suppressed in the output voltage (gate voltage) $V_G$ to be generated when the standby state changes to the active state or when the active state changes to the standby state.

As descried above, in the voltage generating circuit of this embodiment, there are provided the differential amplifier circuit 1, the gate voltage stabilizing circuit 3, the gate voltage stabilizing circuit 4, the N channel MIS transistor NT1, the N channel MIS transistor NT2, the N channel MIS transistors NT11 to NT13, the N channel MIS transistor NTT1, the N channel MIS transistor NTT2, the P channel MIS transistors PT11 to PT13, the P channel MIS transistor PTT1, the P channel MIS transistor PTT2, the resistances $R_{A1}$ to $R_{A4}$, the resistances $R_{S1}$ to $R_{S4}$, and the capacitor C1. The gate voltage stabilizing circuit 3 is provided with the capacitor 3, the N channel MIS transistor NT41, and the N channel MIS transistor NT42. The gate voltage stabilizing circuit 3 suppresses a change in the gate voltage of the step-down transistor when the standby state changes to the active state. The gate voltage stabilizing circuit 4 is provided with the capacitor C4, the P channel MIS transistor PT41, and the P channel MIS transistor PT42. The gate voltage stabilizing circuit 4 suppresses a change in the gate voltage of the step-down transistor when the active state changes to the standby state.

Thus, while an increase is suppressed in the capacitance of the capacitor C1 mounted (on-chip) in a semiconductor integrated circuit where the voltage generating circuit 30*a* is provided, a fluctuation can be suppressed in the output voltage (gate voltage) $V_G$ to be generated when the standby state changes to active state or when active state changes to the standby state. Thereby, the output voltage $V_{INT}$ can be outputted as an internal supply voltage that has been stably stepped down.

Embodiment 3

Figure 9:
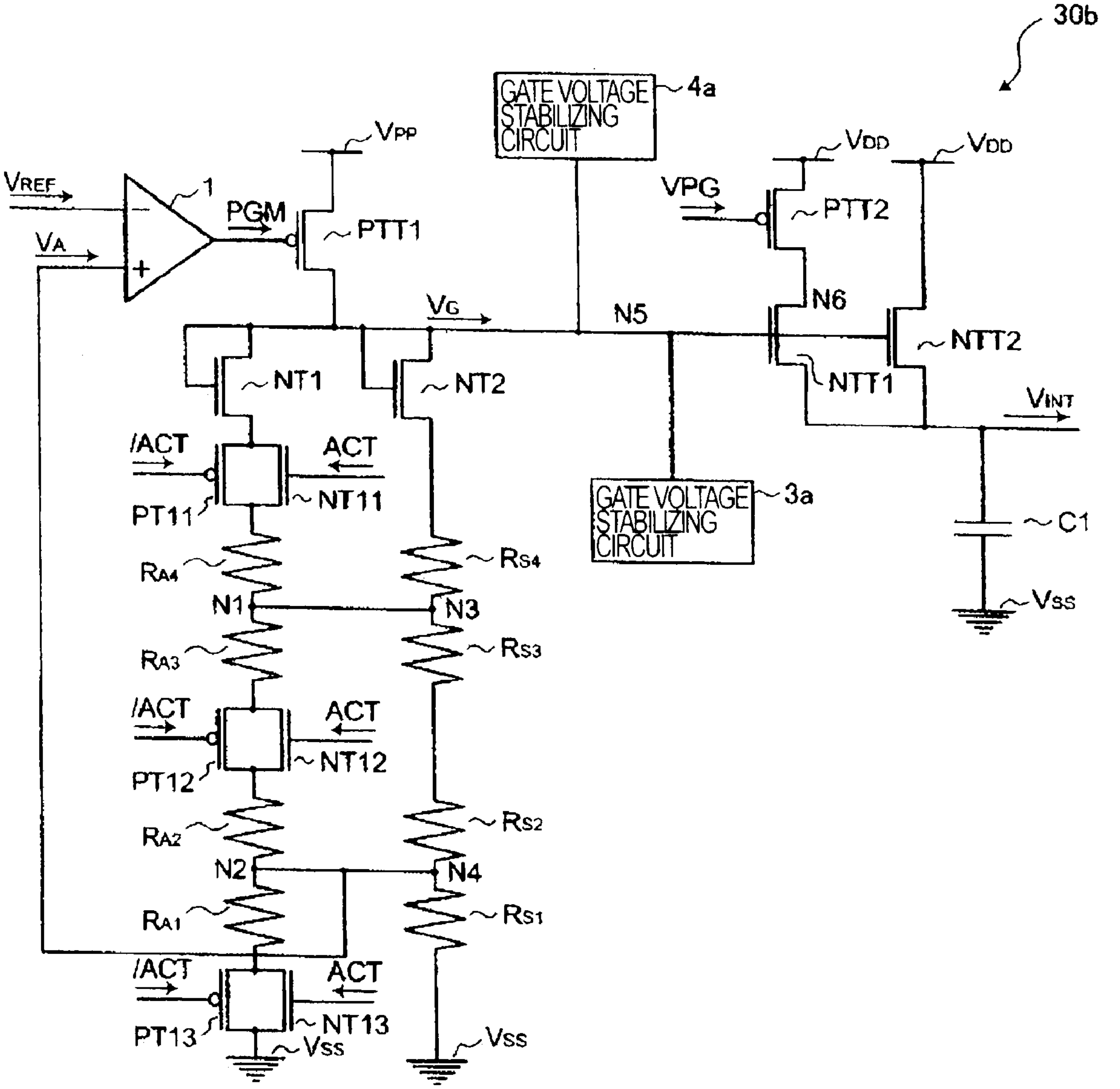
FIG. 9 is a circuit diagram showing a configuration of a voltage generating circuit according to an embodiment 3 of the present invention.
Figure 10:
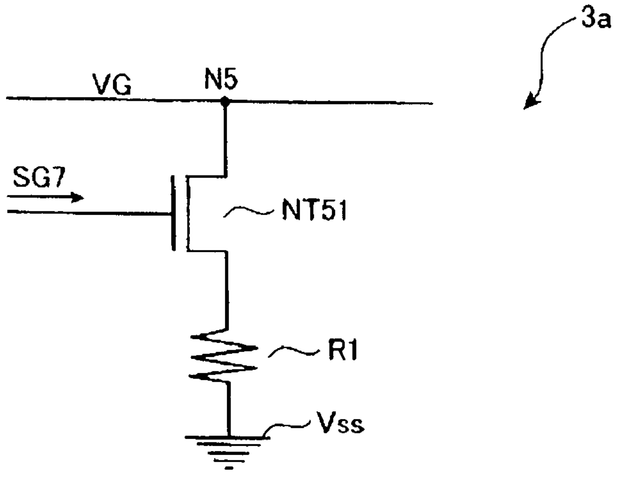
FIG. 10 is a circuit diagram showing a gate voltage stabilizing circuit on the low potential side power source side according to the embodiment 3 of the present invention.

A voltage generating circuit according to an embodiment 3 of the present invention will be described hereinafter with reference to the accompanying drawing. FIG. 9 is a circuit diagram showing a configuration of a voltage generating circuit. FIG. 10 is a circuit diagram showing a gate voltage stabilizing circuit on the high pressure side power source side. In this embodiment, there are provided a gate voltage stabilizing circuit that suppresses a change in the gate voltage of the step-down transistor when a standby state changes to an active state, and a gate voltage stabilizing circuit that suppresses a change in the gate voltage of the step-down transistor when the active state changes to the standby state.

Hereinbelow, same symbols are assigned to components identical to those in the embodiment 1, a description of which is omitted, and only different parts will be described.

As shown in FIG. 9, the voltage generating circuit 30*b* is provided with the differential amplifier circuit 1, a gate voltage stabilizing circuit 3*a*, a gate voltage stabilizing circuit 4*a*, the N channel MIS transistor NT1, the N channel MIS transistor NT2, the N channel MIS transistors NT11 to NT13, the N channel MIS transistor NTT1, the N channel MIS transistor NTT2, the P channel MIS transistors PT11 to PT13, the P channel MIS transistor PTT1, the P channel MIS transistor PTT2, the resistances $R_{A1}$ to $R_{A4}$, the resistances $R_{S1}$ to $R_{S4}$, and the capacitor C1.

The voltage generating circuit 30*b* is provided inside a semiconductor chip as a semiconductor storage, for example. The voltage generating circuit 30*b* receives input of a high potential side power source $V_{DD}$ voltage as an external supply voltage and a high potential side power source $V_{PP}$ voltage as a supply voltage for stepping up a word line voltage, and outputs an output voltage $V_{INT}$ as a stepped-down internal supply voltage to unillustrated various circuits provided in the semiconductor chip.

As shown in FIG. 10, the gate voltage stabilizing circuit 3*a* is provided with an N channel MIS transistor NT51 and a resistance R1. The gate voltage stabilizing circuit 3*a* has a function to suppress a change in the gate voltage of the step-down transistor when the standby state changes to the active state.

In the N channel MIS transistor NT 51, a drain is connected to a node N5 (output voltage (gate voltage) $V_G$), and a control signal SG7 is inputted into a gate. The resistance R1 is connected to a source of the N channel MIS transistor NT51 and the other end is connected to the low potential side power source $V_{SS}$.

When the standby state changes to the active state, the N channel MIS transistor NTT1 that is a step-down transistor supplies the output voltage $V_{INT}$ potential, and then the output voltage (gate voltage) $V_G$ is likely to rise, a control signal having a pulse waveform is inputted into the gate of the N channel MIS transistor NT51. When the control signal SG7 in a pulse waveform is at "High" level, the N channel MIS transistor NT51 turns "ON" and functions to suppress a rise of the output voltage (gate voltage) $V_G$ by drawing out extra charges to be accumulated on the gate of the N channel MIS transistor NTT1 to the low potential side power source $V_{SS}$ through the resistance R1. Here, the control signal SG7 sets a duty ratio and an application period of the pulsed waveform so as not to excessively draw the charges to be accumulated on the gate of the N channel MIS transistor NTT1.

Figure 11:
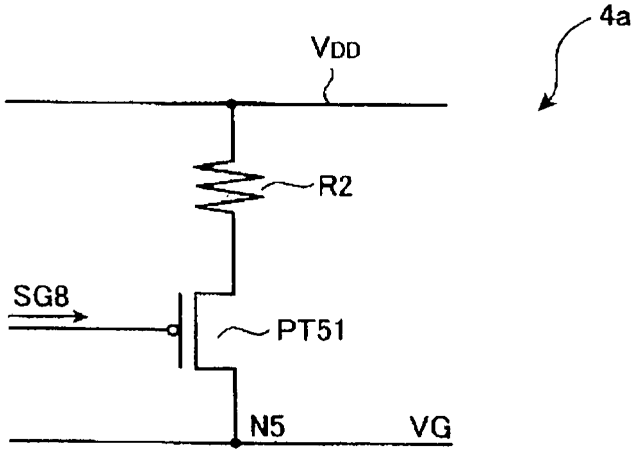
FIG. 11 is a circuit diagram showing a gate voltage stabilizing circuit on the high potential side power source side according to the embodiment 3 of the present invention.

As shown in FIG. 11, a P channel MIS transistor PT51 and a resistance R2 are provided in the gate voltage stabilizing circuit 4*a*. The gate voltage stabilizing circuit 4*a* has a function to suppress a change in the gate voltage of a step-down transistor when the active state changes to the standby state.

One end of the resistance R2 is connected to the high potential side power source $V_{DD}$ and the other end is connected to a source of the P channel MIS transistor PT51. In the P channel MIS transistor PT51, a control signal SG8 is inputted into a gate and a drain is connected to the node NS (output voltage (gate voltage) $V_G$.

When the active state changes to the standby state, the N channel MIS transistor NTT1 that is a step-down transistor turns "OFF," and the output voltage (gate voltage) $V_G$ is likely to lower, the control signal SG8 having a pulse waveform is inputted into the gate of the P channel MIS transistor PT51. When the pulsed control signal SG8 is at "Low" level, the P channel MIS transistor PT51 turns "ON" and functions to supply charges to the gate of the N channel MIS transistor NTT1 via the resistance R2 and to suppress a drop of the output voltage (gate voltage) $V_G$. Here, the control signal SG8 sets a duty ratio and an application period of the pulse waveform so as not to supply excessive charges to the gate of the N channel MIS transistor NTT1.

Next, operation of the voltage generating circuit will be described with reference to FIG. 12. FIG. 12 is a drawing showing the operation of the voltage generating circuit. Here, the operation of the voltage generating circuit is divided into the following 3 periods and described: (A) a period of a standby state (including time to change to an active state), (B) a period of the active state, and (C) a period after the active state changes to the standby state.

As shown in FIG. 12, in the voltage generating circuit 30*b*, first in the standby state (period (A)), since the P channel MIS transistor PTT2 is "OFF" with the control signal VPG at "High" level, the N channel MIS transistor NTT1 does not supply the output voltage $V_{INT}$ potential, while the N channel MIS transistor NTT2 supplies the output voltage $V_{INT}$ potential. In the gate voltage stabilizing circuit 3*a*, the control signal SG7 is at "Low" level, and therefore the N channel MIS transistor NT51 is "OFF". Thus, there is no exchange of a charge between the low potential side power source $V_{SS}$ side and the node N5 (output voltage (gate voltage) $V_G$) via the resistance R1. In the gate voltage stabilizing circuit 4*a*, the control signal SG8 is at "High" level, and therefore the P channel MIS transistor PT51 is "OFF". Thus, there is no exchange of a charge between the high potential side power source $V_{DD}$ side and the node N5 (output voltage (gate voltage) $V_G$) via the resistance R2.

Next, immediately after the standby state changes to the active state (period (A)), as the control signal VPG changes from "High" level to "Low" level and the P channel MIS transistor PTT2 accordingly turns "ON," the condition is maintained in which the N channel MIS transistor NTT1 supplies the output voltage $V_{INT}$ potential, and the N channel MIS transistor NTT2 supplies the output voltage $V_{INT}$ potential. At this time, the voltage on the drain (the node N6) side of the N channel MIS transistor NTT1 rises, and therefore the output voltage (gate voltage) $V_G$ is likely to rise due to the coupling capacitance of the N channel MIS transistor NTT1.

In the gate voltage stabilizing circuit 3*a*, however, since the control signal SG7 changes from "Low" level to "High" level to turn the N channel MIS transistor NT51 "ON," charges flow from the node N5 (output voltage (gate voltage) $V_G$) to the low potential side power source $V_{SS}$ side through the N channel MIS transistor NT51 and the resistance R1. Thus, the gate voltage stabilizing circuit 3*a* functions to lower the gate voltage $V_G$ to be applied to the gate of the N channel MIS transistor NTT1 and to suppress a rise in the output voltage (gate voltage) $V_G$. In addition, the gate voltage stabilizing circuit 4*a* is in the same condition as in the standby state.

Then, when the standby state changes to the active state and after a predetermined period elapses (period (A)), the control signal SG7 is at "Low," and therefore the N channel MIS transistor NT51 turns "OFF". Accordingly, there will be no longer exchange of a charge between the low potential side power source $V_{SS}$ side and the node N5 (the output voltage (gate voltage) $V_G$) through the resistance R1. In the gate voltage stabilizing circuit 4*a*, the control signal SG8 remains at "High," and therefore the P channel MIS transistor PT51 remains to be "OFF". Accordingly, there is no exchange of a charge between the high potential side power source $V_{DD}$ side and the node N5 (output voltage (gate voltage) $V_G$) through the resistance R2.

Then, immediately after the active state changes to the standby state (period (C)), the control signal VPG changes from "High" level to "Low" level, and therefore the P channel MIS transistor PTT2 turns "OFF". Accordingly, the N channel MIS transistor NTT1 no longer supplies the output voltage $V_{INT}$ potential, while the N channel MIS transistor NTT2 supplies the output voltage $V_{INT}$ potential. Then, the voltage on the drain (the node N6) side of the N channel MIS transistor NTT1 lowers, and the output voltage (gate voltage) $V_G$ is likely to lower due to the coupling capacitance of the N channel MIS transistor NTT1.

In the gate voltage stabilizing circuit 4*a*, however, since the control signal SG8 changes from "High" level to "Low" level to switch the P channel MIS transistor PT51 from "OFF" to "ON," charges flow from the high potential side power source $V_{DD}$ side to the node N5 (output voltage (gate voltage) $V_G$) through the P channel MIS transistor PT51 and the resistance R2. For this reason, the gate voltage stabilizing circuit 4*a* functions to raise the gate voltage $V_G$ to be applied to the gate of the N channel MIS transistor NTT1 and to suppress a drop of the output voltage (gate voltage) $V_G$. In addition, the gate voltage stabilizing circuit 3*a* maintains the previous condition.

Next, when the active state changes to the standby state and after a predetermined period elapses (period (C)), which is not unillustrated, the gate voltage stabilizing circuit 3*a* is set identical to the standby state.

Thus, while an increase is suppressed in the capacitance of the capacitor C1 mounted (on-chip) in a semiconductor integrated circuit where the voltage generating circuit 30*b* is provided, a fluctuation can be suppressed in the output voltage (gate voltage) $V_G$ to be generated when the standby state changes to the active state or when the active state changes to the standby state.

As described above, in the voltage generating circuit of the present embodiment, there are provided the differential amplifier circuit 1, the gate voltage stabilizing circuit 3*a*, the gate voltage stabilizing circuit 4*a*, the N channel MIS transistor NT1, the N channel MIS transistor NT2, the N channel MIS transistors NT11 to NT13, the N channel MIS transistor NTT1, then the N channel MIS transistor NTT2, the P channel MIS transistors PT11 to PT13, the P channel MIS transistor PTT1, the P channel MIS transistor PTT2, the resistance $R_{A1}$ to $R_{A4}$, the resistance $R_{S1}$ to $R_{S4}$, and the capacitor C1. The N channel MIS transistor NT51 and the resistance R1 are provided in the gate voltage stabilizing circuit 3*a*. The gate voltage stabilizing circuit 3*a* suppresses a change in the gate voltage of the step-down transistor when the standby state changes to the active state based on the control signal SG7 having a pulse waveform. The P channel MIS transistor PT51 and the resistance R2 are provided in the gate voltage stabilizing circuit 4*a*. The gate voltage stabilizing circuit 4*a* suppresses a change in the gate voltage of the step-down transistor when the active state changes to the standby state based on the control signal SG8 having a pulse waveform.

Thus, while an increase is suppressed in the capacitance of the capacitor C1 mounted (on-chip) in a semiconductor integrated circuit where the voltage generating circuit 30*b* is provided, a fluctuation can be suppressed in the output voltage (gate voltage) $V_G$ to be generated when the standby state changes to the active state or when the active state changes to the standby state. Thereby, the output voltage $V_{INT}$ can be outputted as a stable stepped-down internal supply voltage. In addition, since a fluctuation in the output voltage (gate voltage) $V_G$ is suppressed by using the control signals SG7 and SG8 that have pulse waveforms, excessive drawing or supply of charges can be suppressed.

The present invention is not limited to the embodiments described above, and various changes may be made therein without departing from the scope of the invention.

Although a voltage generating circuit is used as a step-down power source for a semiconductor memory, for example, the voltage generating circuit may also be used as a step-down power source for a system on a chip (SoC), an analog or digital LSI or the like. In addition, although a high potential side power source $V_{DD}$ voltage as an external supply voltage is directly supplied to the source of the P channel MIS transistor PTT2 and the drain of the N channel MIS transistor NTT2 in the voltage generating circuit, an RC circuit for suppressing a fluctuation in the high potential side power source $V_{DD}$ voltage may be provided between the high potential side power source $V_{DD}$ and the source of the P channel MIS transistor PTT2, and between the high potential side power source $V_{DD}$ and the N channel MIS transistor NTT2.

What is claimed is:

1. A voltage generating circuit comprising:

a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current;

a second step-down transistor including a gate controlled by the first voltage and a drain connected to the first high potential side power source, and outputting the second high potential side supply voltage from a source of the second step-down transistor in the active state and in a standby state which allows a flow of a second consumption current whose amount is less than that of the first consumption current; and a gate voltage stabilizing circuit including a first transistor including a drain to which the first voltage is inputted and a gate to which a first control signal is inputted, a second transistor including a drain connected to a source of the first transistor, a source to which the first voltage is inputted, and a gate to which a second control signal is inputted, and a capacitor connected to the source of the first transistor and the drain of the second transistor, when the standby state changes to the active state, the first transistor changing from OFF to ON based on the first control signal, the second transistor changing from ON to OFF based on the second control signal, and therefore the capacitor drawing a charge on the gate side of the first step-down transistor to suppress a fluctuation in the first voltage to be applied to the gate side of the first step-down transistor, and when the active state changes to the standby state, the first transistor changing from OFF to ON based on the first control signal, the second transistor changing from ON to OFF based on the second control signal, and therefore the capacitor discharging an accumulated charge to the gate side of the first step-down transistor to suppress the fluctuation in the first voltage to be applied to the gate of the first step-down transistor.

2. The voltage generating circuit according to claim 1, wherein a first end of the capacitor is connected to the source of the first transistor and to the drain of the second transistor, a third control signal is inputted to a second end of the capacitor, and based on the third control signal, a charge is accumulated in the capacitor or a charge accumulated in the capacitor is discharged.

3. A voltage generating circuit comprising:

a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current;

a second step-down transistor including a gate controlled by the first voltage and a drain connected to the first high potential side power source side, and outputting the second high potential side supply voltage from a source of the second step-down transistor in the active state and in a standby state which allows a flow of a second consumption current whose amount is less than that of the first consumption current; and a first gate voltage stabilizing circuit including:

a first transistor including a drain to which the first voltage is inputted and a gate to which a first control signal is inputted, a second transistor including a drain connected to a source of the first transistor, a source connected to a low potential side power source, and a gate to which a second control signal is inputted, and a first capacitor including a first end connected to a source of the first transistor and to the drain of the second transistor, and a second end connected to the low potential side power source, when the standby state changes to the active state, the first transistor changing from OFF to ON based on the first control signal, the second transistor changing from ON to OFF based on the second control signal, and therefore the first capacitor drawing a charge of the first step-down transistor on the gate side to suppress a fluctuation in the first voltage to be applied to the gate of the first step-down transistor, and a second gate voltage stabilizing circuit including:

a third transistor including a drain to which the first voltage is inputted and a gate to which a third control signal is inputted, a fourth transistor including a source connected to the first high potential side power source, a drain connected to a source of the third transistor, and a gate to which a fourth control signal is inputted, and a second capacitor including a first end connected to the source of the third transistor and to the drain of the fourth transistor, and a second end connected to the first high potential side power source, when the active state changes to the standby state, the third transistor being kept ON based on the third control signal, the fourth transistor being kept OFF based on the fourth control signal, and therefore the second capacitor discharging an accumulated charge to the gate side of the first step-down transistor to suppress the fluctuation in the first voltage to be applied to the gate of the first step-down transistor.

4. A voltage generating circuit comprising:

a first step-down transistor including a gate controlled by a first voltage and a drain connected to a first high potential side power source side, and outputting, from a source of the first step-down transistor, a second high potential side supply voltage obtained by stepping down the first high potential side supply voltage, in an active state which allows a flow of a first consumption current;

a second step-down transistor including a gate controlled by the first voltage and a drain connected to the first high potential side power source, and outputting the second high potential side supply voltage from a source in the active state and in a standby state which allows a flow of a second consumption current whose amount is less than that of the first consumption current; and a first gate voltage stabilizing circuit including a first transistor including a drain to which the first voltage is inputted and a gate to which a first control signal is inputted, and a first resistance including first and second ends connected to a source of the first transistor and to a low potential side power source, respectively, when the standby state changes to the active state, the first transistor changing from OFF to ON based on the first control signal, and therefore the first gate voltage stabilizing circuit drawing a charge on the gate side of the first step-down transistor to the low potential side power source side through the first resistance to suppress a fluctuation in the first voltage to be applied to the gate of the first step-down transistor; and a second gate voltage stabilizing circuit including a second transistor including a drain to which the first voltage is inputted and a gate to which a second control signal is inputted, and a second resistance including first and second ends connected to a source of the second transistor and to the first high potential side power source, respectively, when the active state changes to the standby state, the second transistor turning ON based on the second control signal, and therefore the second gate voltage stabilizing circuit supplying a charge from the first high potential side power source side to the gate side of the first step-down transistor through the resistance R2 to suppress the fluctuation in the first voltage to be applied to the gate of the first step-down transistor.

5. The voltage generating circuit according to claim 4, wherein the first control signal is a pulse signal whose duty cycle and application period are set so as not to excessively draw the charge accumulated in the gate of the first step-down transistor, and the second control signal is a pulse signal whose duty cycle and application period are set so as not to excessively supply a charge to the gate of the first step-down transistor.

6. A voltage generating circuit comprising:

a switching device which includes a first end connected to a high potential side power source, and which becomes conductive in a first mode and becomes non-conductive in a second mode;

a first transistor including a first main electrode connected to a second end of the switching device, a second main electrode connected to an output terminal, and a gate connected to a gate potential supply node;

a second transistor including a first main electrode connected to the high potential side power source, a second main electrode connected to the output terminal, and a gate connected to the gate potential supply node; and a gate voltage stabilizing circuit that suppresses a fluctuation in potential of the potential supply node, the fluctuation accompanying a change between the first and second modes.

7. The voltage generating circuit according to claim 6 further comprising a stabilizing capacitor connected to the output terminal.

8. The voltage generating circuit according to claim 6, wherein a gate width of the first transistor is wider than that of the second transistor.

9. The voltage generating circuit according to claim 6, wherein the gate voltage stabilizing circuit suppresses a drop in the potential of the potential supply node when the first mode changes to the second mode.

10. The voltage generating circuit according to claim 9, wherein the gate voltage stabilizing circuit includes a capacitor including a first end connected to the gate potential supply node, and raises potential of a second end of the capacitor when the first mode changes to the second mode.

11. The voltage generating circuit according to claim 9, wherein the gate voltage stabilizing circuit includes a second switching device including a first end connected to the gate potential supply node, and a capacitor connected to a second end of the second switching device, and the gate voltage stabilizing circuit discharges a charge accumulated in the capacitor to the gate potential supply node by making the second switching device conductive when the first mode changes to the second mode.

12. The voltage generating circuit according to claim 6, wherein the gate voltage stabilizing circuit suppresses a rise in potential of the potential supply node when the second mode changes to the first mode.

13. The voltage generating circuit according to claim 12, wherein the gate voltage stabilizing circuit includes a capacitor including a first end connected to the gate potential supply node, and the gate voltage stabilizing circuit lowers potential of a second end of the capacitor when the second mode changes to the first mode.

14. The voltage generating circuit according to claim 12, wherein the gate voltage stabilizing circuit includes a third switching device including a first end connected to the gate potential supply node, and a capacitor connected to a second end of the third switching device, and the gate voltage stabilizing circuit discharges a charge from the gate potential supply node to the capacitor by making the third switching device conductive when the second mode changes to the first mode.

* * * * *